March 20, 1928.
M. D. MORRIS ET AL
1,663,259
ADJUSTABLE COUPLING
Filed April 30, 1926
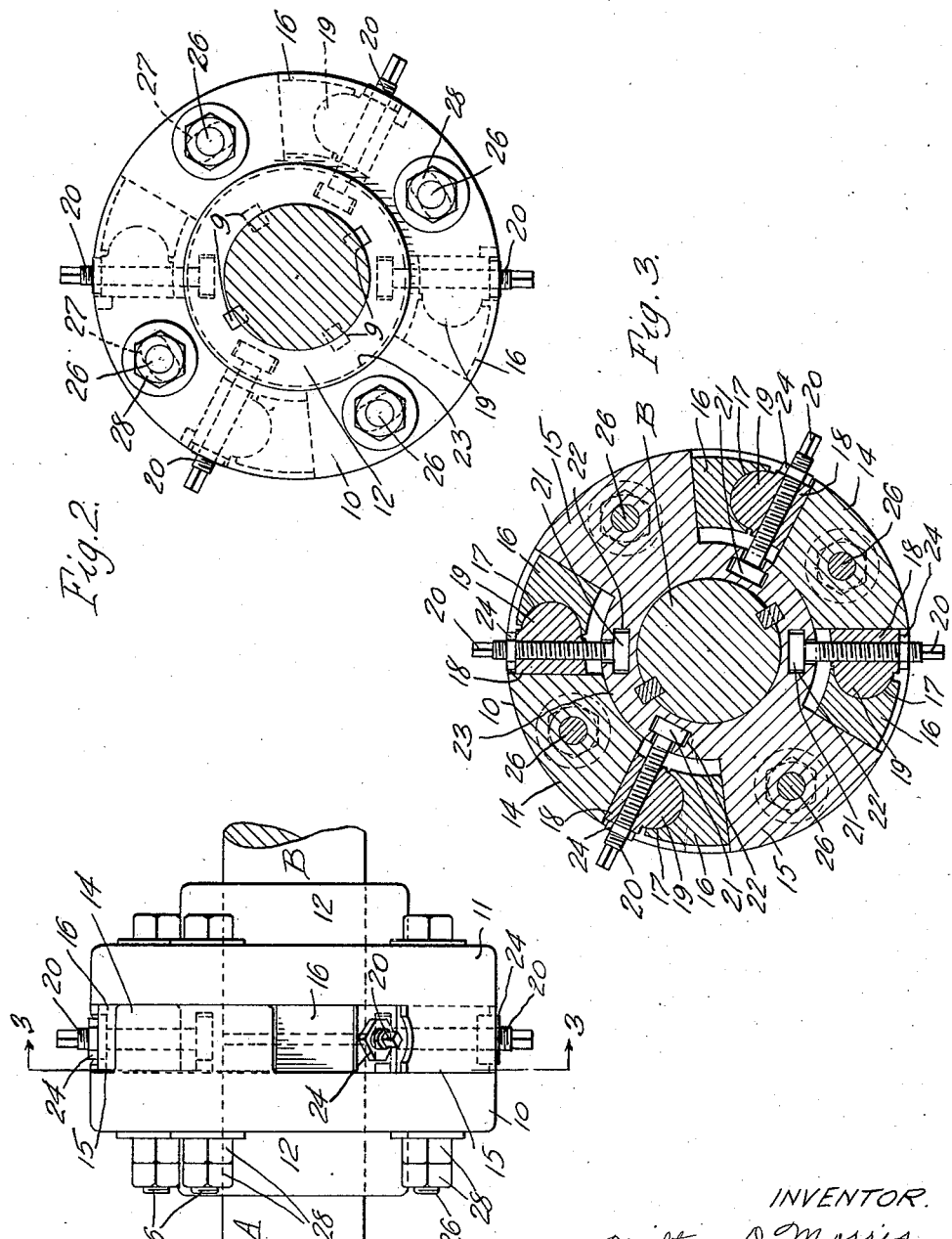
INVENTOR.
Milton D. Morris,
and
Edward G. DuBarry,
By Parker & Prochnow
ATTORNEYS.

Patented Mar. 20, 1928.

1,663,259

UNITED STATES PATENT OFFICE.

MILTON D. MORRIS, OF BUFFALO, AND EDWARD G. DU BARRY, OF HAMBURG, NEW YORK.

ADJUSTABLE COUPLING.

Application filed April 30, 1926. Serial No. 105,712.

This invention relates to coupling devices for transmitting power or motion from a driving to a driven member and which are adjustable to vary the angular relationship of the driving and driven members about their axes.

The objects of this invention are to provide a coupling of this kind of improved construction which can be easily and accurately adjusted; also to provide a coupling of this kind of strong and rugged construction and in which the parts are so formed as to offer the maximum resistance to crushing; also to improve the construction of adjustable couplings of this kind in other respects hereinafter specified.

In the accompanying drawings,

Fig. 1 is a side elevation of an adjustable coupling embodying this invention.

Fig. 2 is face view thereof.

Fig. 3 is a sectional elevation thereof on line 3—3, Fig. 1.

The two parts of the coupling may be connected to driving and driven members of any desired kind, two shafts A, B, being shown in the construction illustrated, either of which may be the driven member, and keys 9 may be used to connect the coupling members to the two shafts. 10 and 11 represent the two members of the coupling which are secured by means of the keys 9 to the shafts A, B, respectively. Each coupling member is provided with a hub portion 12, and a bore provided with suitable keyways for the keys 9 extends through the hub and body portion of each coupling member to permit each coupling member to be rigidly secured to a shaft. Any other means for securing the members of the coupling to the driving and driven members may be employed, if desired.

In the particular construction shown the two adjacent coupling members are provided with sector shaped projections 14 and 15 formed respectively on the coupling members 10 and 11, the projections of one coupling member extending into the spaces between the projections of the other coupling member so as to form a staggered or alternate arrangement of the projections. In the particular construction shown, two projections are formed on each coupling member, and the adjacent projections are spaced apart so that the spaces between projections are considerably wider circumferentially than the projections. The oppositely arranged faces of the projections are arranged at an angle to each other so that these faces converge, and preferably these faces extend substantially radially toward the axis of rotation, and between the substantially radial or converging faces of the projections of the coupling members, wedges are positioned which are movable between the converging faces, preferably toward and from the axis of the coupling members to adjust these members circumferentially relatively to each other. Since an adjustment of one coupling member relatively to the other one changes the angle between adjacent faces of the projections 14 and 15, the wedges are preferably made in two parts which are capable of adjustment relatively to each other to compensate for variations in this angle and which are so formed as to transmit heavy forces from one part of a wedge block to the other part. In the construction shown for this purpose each wedge includes a part 16 having a concave recess 17, and a part 18 having a convex projection 19 adapted to enter into the recess 17. The outer faces of the wedges are preferably flat and are adapted to bear against the corresponding radial faces of the projections 14 and 15 and are also adjustable axially relatively to these faces. The meeting faces of the convex projection and recess are preferably substantially semi-cylindrical and afford a large bearing surface to withstand the stresses produced when power is transmitted through the coupling, and this bearing surface makes it possible to arrange the outer flat faces of the two parts of each wedge member at different angles to each other.

Any suitable means may be provided for adjusting the compound wedges toward and from the axis of rotation of the coupling member. In the particular construction shown threaded bolts 20 are employed for this purpose, the heads 21 of which are suitably held against outward movement, being, as illustrated, arranged in recesses 22 provided in an annular flange 23 formed on the coupling member 11 and arranged inwardly or toward the axis of rotation with reference to the projections 14 and 15. These adjusting bolts or screws are provided at their outer ends with portions adapted to be engaged by a wrench or other tool for turning the same and since each of these bolts has a threaded engagement with the part 18 of a wedge, it will be obvious that the turning of the bolts will produce a radial movement of the wedges. 24 represents lock nuts which are adapted to hold the bolts in their adjusted positions.

Any suitable means may be provided, if desired, for holding the two coupling members together. In the construction shown for this purpose a plurality of bolts 26 extend through holes in one of the coupling members and through slots 27 in the other member, nuts 28 being provided on the bolts for drawing the two members of the coupling together. The slots 27 permit of adjustment of one of the coupling members relatively to the other.

In order to adjust the coupling, the nuts 28 are first released to permit the coupling members to move circumferentially relatively to each other. Two oppositely disposed wedges are then moved outwardly from the center or axis of the coupling, and then the alternate wedges are moved toward the center to the same extent to effect adjustment of one of the parts of the coupling member relatively to the other.

During the operation of the coupling member the opposite flat faces of each wedge and the concave and convex faces of the two parts thereof afford an ample bearing surface so that a large amount of power may be transmitted from one shaft to the other without submitting the wedges or projections on the coupling members to strains which might crush or damage the metal of these parts.

By means of the construction shown, an accurate and delicate adjustment of the two coupling members can be effected by turning of the adjusting screws of the wedges.

We claim as our invention:—

1. An adjustable coupling including a pair of coupling members, each having projections extending into alternate arrangement with the projections of the other coupling member about the axis of said coupling, the opposite faces of adjacent projections being inclined relatively to each other, and wedges arranged between said inclined faces and movable to different positions relatively thereto, said wedges each including a part having a convex substantially cylindrical portion adapted to interfit with a concave substantially cylindrical portion of the other wedge part to permit an angular adjustment of said parts to the wedge relatively to each other about centers extending substantially parallel to the axis of the coupling.

2. An adjustable coupling including two members each having projections extending into staggered relation to the projections of the other coupling member, wedges arranged between adjacent projections, each of said wedges being formed of two parts having interfitting portions substantially coextensive with the lengths of said wedges and enabling the parts of the wedges to swing into different angular relations to each other about axes substantially parallel with the axis of the coupling, and means for adjusting said wedges into different relations to said projections to vary the adjustment of said coupling members relatively to each other.

3. A coupling including a pair of coupling members each having projections extending into alternate arrangement with the projections of the other coupling member about the axis of said coupling, wedges arranged between adjacent projections and including two parts, each part having a substantially flat face adapted to engage an inclined face of said coupling and a substantially cylindrical face adapted to interfit with a complementary cylindrical face of the other part of the wedge, to permit of angular adjustment of said parts only about axes substantially parallel to the axis of said coupling, and means engaging one of said wedge parts for adjusting said wedge relatively to said projections.

4. A coupling including a pair of coupling members each having projections extending into alternate arrangement with the projections of the other coupling member about the axis of said coupling, wedges arranged between adjacent projections and including two parts, one part having a flat outer face and a substantially cylindrical concave inner face and the other part having a flat outer face and a substantially cylindrical convex inner face fitting into the concave face of said other part, and a separate adjusting screw for each wedge, each adjusting screw engaging one part of a wedge for moving the same into different relations to the inclined faces of said projections toward and from the axis of said coupling to effect a circumferential adjustment of one coupling member relatively to the other coupling member.

5. An adjustable coupling including a pair of coupling members, each having projections extending into staggered relation to the projections of the other coupling member and spaced apart, composite wedges arranged between adjacent projections and movable radially to effect relative circumferential adjustment of said coupling members, each wedge consisting of two parts having an interfitting connection which is substantially coextensive with the length of said parts for changing the angular relation of said parts relatively to each other only about axes substantially parallel with the axis of the coupling, and means for clamping said two coupling members together in their adjusted positions.

MILTON D. MORRIS.
EDWARD G. DU BARRY.